United States Patent
Nakanishi

(10) Patent No.: US 8,102,677 B2
(45) Date of Patent: Jan. 24, 2012

(54) SWITCHING POWER SUPPLY DEVICE AND METHOD FOR ADJUSTING DEAD TIME THEREOF

(75) Inventor: Ryouta Nakanishi, Saitama (JP)

(73) Assignee: Sanken Electric Co., Ltd., Saitama-Ken (JP)

( * ) Notice: Subject to any disclaimer, the term of this patent is extended or adjusted under 35 U.S.C. 154(b) by 374 days.

(21) Appl. No.: 12/502,705

(22) Filed: Jul. 14, 2009

(65) Prior Publication Data

US 2010/0014320 A1 Jan. 21, 2010

(30) Foreign Application Priority Data

Jul. 17, 2008 (JP) .................. 2008-186261

(51) Int. Cl.
*H02M 3/335* (2006.01)
*H02M 3/24* (2006.01)

(52) U.S. Cl. .................. 363/21.02; 363/17; 363/98
(58) Field of Classification Search .............. 363/16, 363/17, 21.01, 21.02, 21.03, 56.01, 56.02, 363/97, 98, 131, 132
See application file for complete search history.

(56) References Cited

U.S. PATENT DOCUMENTS

| | | | |
|---|---|---|---|
| 5,488,269 A * | 1/1996 | El-Hamamsy et al. | 315/307 |
| 6,466,456 B2 * | 10/2002 | Sauerlaender et al. | 363/16 |
| 2003/0107905 A1 | 6/2003 | Miura et al. | |
| 2006/0291117 A1 | 12/2006 | Kyono | |
| 2010/0020569 A1 * | 1/2010 | Melanson et al. | 363/21.03 |

FOREIGN PATENT DOCUMENTS

| | | |
|---|---|---|
| JP | 8289540 | 11/1996 |
| JP | 10248237 | 9/1998 |
| JP | 2003189592 | 7/2003 |
| JP | 2003235240 | 8/2003 |
| JP | 2007006614 | 1/2007 |

* cited by examiner

*Primary Examiner* — Matthew Nguyen
(74) *Attorney, Agent, or Firm* — Wilmer Cutler Pickering Hale and Dorr LLP

(57) ABSTRACT

A resonant switching power supply device includes: a first switching element and a second switching element which are configured to convert and adjust power. A capacitance of a first/second gate-drain capacitor existing between a gate and a drain of the first/second switching element and a resistance of a first/second gate resistor of the first/second switching element are set such that, in a period during which a resonance current flows by switching the second/first switching element, a gate-source voltage of the first/second switching element is lower than an ON threshold voltage of the first/second switching element due to the resonance current divided into the first/second gate-drain capacitor.

8 Claims, 13 Drawing Sheets

SWITCHING POWER SUPPLY DEVICE AND METHOD FOR ADJUSTING DEAD TIME THEREOF

CROSS-REFERENCE TO RELATED APPLICATIONS

This application is based upon and claims priority from Japanese Patent Application No. 2008-186261 filed on Jul. 17, 2008, the entire contents of which are incorporated herein by reference.

BACKGROUND OF THE INVENTION

1. Technical Field

The present invention relates to a switching power supply device and, in particular, to a technique for adjusting a dead time of a gate drive circuit used in the switching power supply device.

2. Description of the Related Art

Resonant switching power supply devices which make use of voltage-current resonance phenomena to perform zero voltage switching (ZVS), thereby to reduce losses on switching and to improve the efficiency have been used. FIG. 10 shows one example of a circuit configuration of a resonant switching power supply device. Operations of the resonant switching power supply device shown in FIG. 10 are disclosed, for example, in JP-A-8-289640 and JP-A-2007-6614. A switching power supply device includes a series circuit in which high side and low side switching elements are connected between a positive electrode and a negative electrode of a direct-current power supply, and these switching elements are switched alternately to obtain an output from an intermediate connection point thereof. In a power supply device such as the switching power supply, as described in JP-A-8-289640 and JP-A-2007-6614, a dead time is set for a gate signal so that the high side and the low side switching elements will not cause a short-circuit on switching. In most cases, the dead time is set by a control circuit for generating a gate signal (hereinafter, referred to as a gate signal control circuit).

Hereinafter, a more detailed description will be given for the switching operation of the switching power supply device 1 shown in FIG. 10 with reference to FIG. 11 to FIG. 13. The direction of each arrow shown in FIG. 10 indicates a positive direction of an operating waveform.

As shown in FIG. 10, the switching power supply device 1 includes a first series circuit including a switching element Q1 (a high side switching element) and a switching element Q2 (a low side switching element) which are connected to the both ends of a direct current power supply Vin. Each of the switching element Q1 and the switching element Q2 includes, for example, MOSFET (Metal Oxide Semiconductor Field Effect Transistor) or an IGBT (Insulated Gate Bipolar Transistor). The switching power supply device 1 further includes a second series circuit including a leakage inductance Lri, a primary winding N11 of an output transformer T1 (primary winding inductance Lp) and a current resonance capacitor Cri is connected in parallel to the switching element Q2. The direct current power supply Vin includes, for example, a power supply circuit configured to obtain a direct current voltage, in which a commercial alternating current power supply is subjected to full-wave rectification and to smoothing by a smoothing capacitor.

A series circuit including a diode Do and a smoothing capacitor Co is connected in parallel to a secondary winding N12 of the output transformer T1, and the primary winding N11 and the secondary winding N12 of the output transformer T1 are wound around so as to give voltage polarity as indicated by an illustrated polarity mark, thus constituting a rectifying smoothing circuit. An output voltage of the rectifying smoothing circuit obtained through rectification and smoothing by the diode Do and the smoothing capacitor Co is given as an output voltage of the switching power supply device 1, thereby supplying a direct current power to load RL connected in parallel to the smoothing capacitor Co. A voltage feedback circuit 2 detects an output voltage of the rectifying smoothing circuit and outputs it to gate power supplies VpH, VpL. Based on a detected voltage from the voltage feedback circuit 2, the gate power supplies VpH, VpL generate gate signals, thereby controlling the output voltage of the switching power supply device 1. The gate power supplies VpH, VpL are provided with a gate signal control circuit for generating gate signals, and dead time for preventing short-circuits on switching is set in the gate signal control circuit.

FIG. 10 shows an example where an N channel MOSFET is used as the switching elements Q1 and Q2. The gate power supplies VpH, VpL are connected to the gates of the switching elements Q1 and Q2 via gate resistors Rg1 and Rg2, by which the switching elements Q1 and Q2 are controlled for ON/OFF operation. Further, parasitic capacitors Cgd1 (gate-drain capacitor of Q1), Cgs1 (gate-source capacitor of Q1), Cds1 (drain-source capacitor of Q1), Cgd2 (gate-drain capacitor of Q2), Cgd2 (gate-source capacitor of Q2) and Cds2 (drain-source capacitor of Q2), a body diode DH of Q1 (acting as a high side feedback diode) and a body diode DL of Q2 (acting as a low side feedback diode) are connected between the gates, sources and drains of the switching elements Q1 and Q2.

<ON-Time Operation of Switching Element Q2>

A portion (a) of FIG. 11 shows operations when the low side switching element Q2 is shifted from OFF to ON. Further, FIG. 12 shows an enlarged view of the portion (a) of FIG. 11.

The portion (a) shown in FIG. 11 shows operating waveforms when the high side switching element Q1 is shifted from ON to OFF and the low side switching element Q2 is shifted from OFF to ON.

Operating waveforms shown in FIG. 11 include sequentially from the top a drain-source voltage waveform Vds1 of the switching element Q1, a gate signal Vg1 of the switching element Q1, a drain-source voltage waveform Vds2 of the switching element Q2, a gate signal Vg2 of the switching element Q2, a voltage VCgs2 of gate-source capacitor Cgs2 of the switching element Q2, a current ICds2 of drain-source capacitor Cds2 of the switching element Q2, a current ICgd2 of gate-drain capacitor Cgd2 of the switching element Q2, a resonance current ICri of the current resonance capacitor Cri, and a current $I_{DL}$ of the body diode DL.

The operating waveforms shown in FIG. 12 are enlargements corresponding to the portion (a) shown in FIG. 11, and they are sequentially from the top a drain-source voltage waveform Vds2 of the switching element Q2, a gate signal Vg2 of the switching element Q2, a voltage VCgs2 of gate-source capacitor Cgs2 of the switching element Q2, a current ICds2 of drain-source capacitor Cds2 of the switching element Q2, a current ICgd2 of gate-drain capacitor Cgd2 of the switching element Q2, a resonance current ICri of the current resonance capacitor Cri, and a current $I_{DL}$ of the body diode DL.

Time points t1 to t6 shown in FIG. 11 and FIG. 12 denote the time points as follows:

t1: point at which the gate signal Vg1 falls down;
t2: point at which the current $I_{DL}$ of body diode DL starts to conduct;
t3: point at which the gate signal Vg2 rises up;
t4: point at which the gate signal Vg2 falls down;
t5: point at which the current $I_{DH}$ (not illustrated) of body diode DH starts to conduct; and
t6: point at which the gate signal Vg1 rises up.

At the time point t1 at which the gate signal Vg1 falls down and when the high side switching element Q1 is shifted from an ON state to an OFF state, the drain-source voltage Vds1 of the high side switching element Q1 conducts a quasi-voltage resonance operation. In this instance, parasitic capacitors (Cds1, Cds2, Cgd1, Cgd2) of the switching elements Q1 and Q2 are charged and discharged by a resonance current ICri (high side Cds1 and Cgd1 are charged, while low side Cds2 and Cgd2 are discharged). At this time, the ICri is divided into a high side and a low side (where the switching elements Q1 and Q2 are equal in parasitic capacitor, the ICri is equally divided into two). The divided resonance current is further divided into Cds1 and Cgd1 on the high side and into Cds2 and Cgd2 on the low side. This proportion equals a capacitance ratio of the capacitors Cds1 to Cgd1 on the high side and a capacitance ratio of the capacitors Cds2 to Cgd2 on the low side. In this instance, a resonance current flown into the Cgd2 charges the gate-source capacitor Cgs2 of the switching element Q2 in a negative direction. This charge voltage is decided by a product Rg2×ICgd2 of the current ICgd2 flowing into the gate resistor Rg2 and the capacitor Cgd2 of the switching element Q2.

At the time point 2 at which the parasitic capacitor of the low side switching element Q2 is completely discharged, a body diode DL connected in inverse-parallel to the low side switching element Q2 is conducted. Conduction of the body diode DL allows a resonance current to flow via the body diode DL, thereby no resonance current flows through the parasitic capacitor Cds2 or Cgd2.

In this instance, at the time point t3 in a period Tc during which the body diode DL is conducted, the low side switching element Q2 is allowed to switch on, thereby performing zero voltage switching (ZVS). However, a period from t1 to t3, that is, from the time when a gate signal Vg1 of the high side switching element Q1 falls down at the time point t1 to the time when a gate signal Vg2 of the switching element Q2 rises up at the time point t3 is secured as a dead time td1 on a gate signal control circuit, thereby eliminating a possibility that the high side switching element Q1 and the low side switching element Q2 are conducted simultaneously and damaged.

<OFF Time Operation of Switching Element Q2>

A portion (b) of FIG. 11 shows operations when the low side switching element Q2 is shifted from ON to OFF. FIG. 13 shows an enlarged view of the portion (b) of FIG. 11(b).

The portion (b) of FIG. 11 shows operating waveforms when the high side switching element Q1 is shifted from OFF to ON and the low side switching element Q2 is shifted from ON to OFF.

The operating waveforms shown in FIG. 13 are enlargements of the portion (b) of FIG. 11, and similar to FIG. 12, FIG. 13 shows sequentially from the top a drain-source voltage waveform Vds2 of the switching element Q2, a gate signal Vg2 of the switching element Q2, a voltage VCgs2 of gate-source capacitor Cgs2 of the switching element Q2, a current ICds2 of drain-source capacitor Cds2 of the switching element Q2, a current ICgd2 of gate-drain capacitor Cgd2 of the switching element Q2, a resonance current ICri of the current resonance capacitor Cri, and a current $I_{DL}$ of the body diode DL.

Time points t4 to t6 shown in FIG. 13 denote, as shown in FIG. 11 and FIG. 12, the time points as follows:

t4: point at which the gate signal Vg2 falls down;
t5: point at which the current $I_{DH}$ (not illustrated) of body diode DH starts to conduct; and
t6: point at which the gate signal Vg1 rises up.

The gate signal Vg2 falls down at the time point t4, and when the low side switching element Q2 is shifted from an ON state to an OFF state, the drain-source voltage Vds2 of the low side switching element Q2 conducts a quasi-voltage resonance operation. At this time, parasitic capacitors (Cds1, Cds2, Cgd1, Cgd2) of the switching elements Q1 and Q2 are charged and discharged by a resonance current ICri (high side Cds1 and Cgd1 are discharged, while low side Cds2 and Cgd2 are charged). At this time, the ICri is divided into a high side and a low side (where the switching elements Q1 and Q2 are equal in parasitic capacitor, the ICri is equally divided into two). The divided resonance current is further divided into Cds1 and Cgd1 on the high side and into Cds2 and Cgd2 on the low side. This proportion equals a capacitance ratio of the capacitors Cds1 to Cgd1 on the high side and a capacitance ratio of the capacitors Cds2 to Cgd2 on the low side. At this time, a resonance current flown into the Cgd2 charges the gate-source capacitor Cgs2 of the switching element Q2 in a positive direction. This charge voltage is decided by a product Rg2×ICgd2 of the current ICgd2 flowing into the gate resistor Rg2 and the capacitor Cgd2 of the switching element Q2.

At the time point t5, when charge of the parasitic capacitor of the low side switching element Q2 is completed, at the same time, the parasitic capacitor of the high side switching element Q1 is also completely discharged. A body diode DH connected in inverse-parallel to the high side switching element Q1 is conducted. Conduction of the body diode DH allows a resonance current to flow via the body diode DH, thereby no resonance current flows through the drain-source capacitors Cds1 and Cgd1.

In this instance, in a period Td (an operating waveform of $I_{DH}$ is not illustrated) during which the body diode DL is conducted, the high side switching element Q1 is allowed to turn on, thereby performing zero voltage switching (ZVS). However, a period from t4 to t6, that is, from the time when a gate signal Vg2 of the low side switching element Q2 falls down at the time point 4 to the time when a gate signal Vg1 of the switching element Q1 rises up at the time point 6 is secured as a dead time td2 on a gate signal control circuit, thereby eliminating a possibility that the high side switching element Q1 and the low side switching element Q2 are conducted simultaneously and damaged.

As described above, in the switching power supply device 1, a gate signal control circuit is used to set a dead time td, thereby supplying a gate signal Vg to the gates of the switching elements Q1 and Q2. Further, in order to turn the switching elements Q1 and Q2 on quickly after the dead time, a small value of the gate resistor is usually selected, as disclosed for example, in JP-A-2003-189592.

SUMMARY OF THE INVENTION

As described above, in the switching power supply device 1, the dead time td is set inside a gate signal control circuit, which results in that the gate signal control circuit is complicated.

Further, since no dead time can be secured when one (single) gate signal Vg is used for turn on and off a plurality of switching elements at the same time, it is necessary to generate and supply gate signals Vg in which the dead time is individually secured.

Still further, a value of the dead time td is set to a certain value in the gate signal control circuit so as to avoid short-circuits to the switching elements Q1 and Q2, with consideration given to any change in turn-on/turn-off characteristics of the switching elements due to temperatures and variation in performance of the elements. Consequently, the value is not necessarily appropriate.

Moreover, in the above switching power supply device 1, the low side switching element Q2 (or the high side switching element Q1) is allowed to turn on in a period during which a body diode DL (or DH) is conducted, thereby performing zero voltage switching (ZVS). Therefore, a gate signal Vg for allowing the switching elements Q1 and Q2 to turn on is applied after a resonance current is started to flow into the body diode, thereby a dead time period is made longer.

In addition, in order to allow switching elements to turn on quickly after the elapse of dead time, a small value for a gate resistor is usually selected as disclosed, e.g., in JP-A-2003-189592. However, this increases a peak value of a gate current, which results in an increase in a practical value of the gate current. Here, since the loss of a gate resistor is proportional to the square of the gate current, the gate resistor develops heat, a gate drive circuit is increased in loss and a power supply is decreased in efficiency. In particular, when the circuit is made operable at high frequency, since the loss is proportional to the high frequency, which results in the further increase of the loss.

In view of the above circumstances, an object of the present invention is to provide a gate drive circuit capable of adjusting a dead time in the gate drive circuit without setting the dead time in a gate signal control circuit, capable of keeping an appropriate value of the dead time even when turn-off/turn-on characteristics are changed, and capable of improving the efficiency of a power supply.

According to an aspect of the invention, there is provided a resonant switching power supply device comprising: a first switching element and a second switching element which are configured to convert and adjust power, wherein a capacitance of a first gate-drain capacitor existing between a gate and a drain of the first switching element and a resistance of a first gate resistor of the first switching element are set such that, in a period during which a resonance current flows by switching the second switching element, a gate-source voltage of the first switching element is lower than an ON threshold voltage of the first switching element due to the resonance current divided into the first gate-drain capacitor, and wherein a capacitance of a second gate-drain capacitor existing between a gate and a drain of the second switching element and a resistance of a second gate resistor of the second switching element are set such that, in a period during which a resonance current flows by switching the first switching element, a gate-source voltage of the second switching element is lower than an ON threshold voltage of the second switching element due to the resonance current divided into the second gate-drain capacitor.

According to another aspect of the invention, there is provided a method for adjusting a dead time of a resonant switching power supply device comprising a first switching element and a second switching element which are connected to a direct current power supply, said method comprising: setting a capacitance of a first gate-drain capacitor existing between a gate and a drain of the first switching element and a resistance of a first gate resistor of the first switching element such that a gate-source voltage of the first switching element is lower than an ON threshold voltage of the first switching element by generating a voltage drop at the first gate resistor by a resonance current divided into the first gate-drain capacitor of the first switching element in response to a switching of the second switching element; and setting a capacitance of a second gate-drain capacitor existing between a gate and a drain of the second switching element and a resistance of a second gate resistor of the second switching element such that a gate-source voltage of the second switching element is lower than an ON threshold voltage of the second switching element by generating a voltage drop at the second gate resistor by a resonance current divided into the second gate-drain capacitor of the second switching element in response to a switching of the first switching element.

DETAILED DESCRIPTION OF THE EMBODIMENTS

Next, a description will be given specifically for the best mode for carrying out the present invention with reference to the drawings.

First Embodiment

Figure 1:
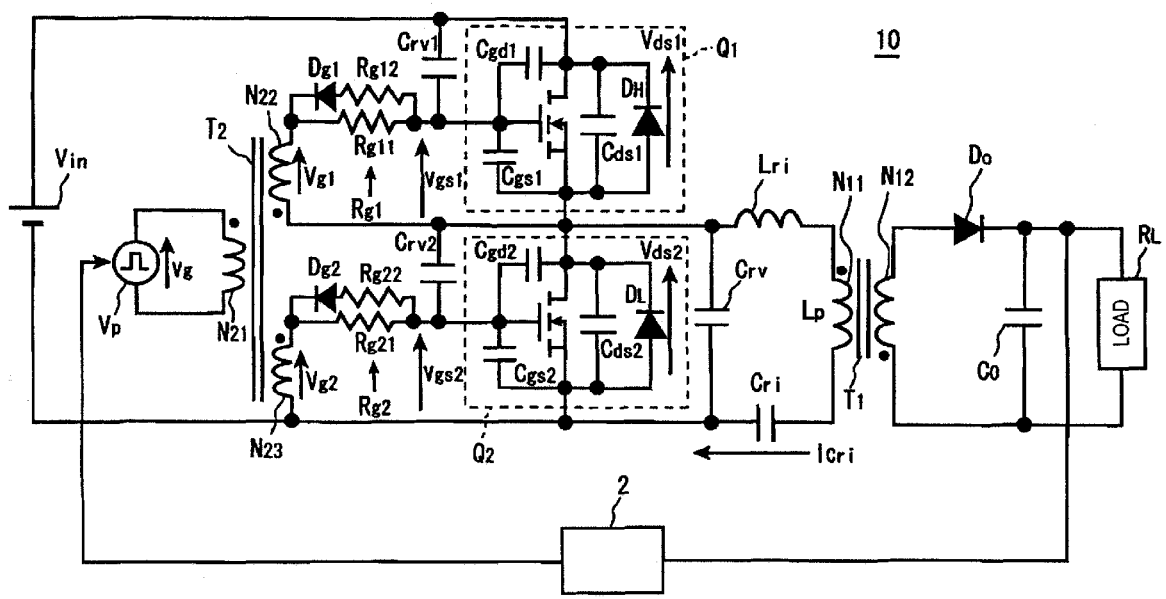
FIG. 1 is a diagram showing a circuit configuration of a switching power supply device according to a first embodiment of the present invention.

FIG. 1 shows a circuit configuration of the switching power supply device according to a first embodiment of the present invention. In this embodiment, and N channel MOSFET is used in each of a high side switching element Q1 and a low side switching element Q2. In the switching power supply device 10, gate signals of the switching element Q1 and the switching element Q2 are generated from one gate signal Vg by a secondary winding N22 and a tertiary winding N23 of one (single) drive transformer T2 as gate signals Vg1 and Vg2 which are mutually reversed. Further, capacitors Crv1 and Crv2 are connected in parallel respectively to parasitic capacitors Cgd1 and Cgd2 formed between the gate and the source of the respective switching elements Q1 and Q2, and values of the gate-drain capacitor and gate resistors are adjusted such that a voltage developed on the gate resistors Rg1, Rg2 is increased by a resonant circulation current, thereby to make a gate voltage lower than an ON threshold voltage Vth of the MOSFET.

Since voltages of the secondary winding N22 (gate signal Vg1) and the tertiary winding N23 (gate signal Vg2) of the drive transformer T2 are changed at the same time, if a high side gate signal and a low side gate signal are formed based on these signals, a dead time cannot generally be secured. However, according to the present embodiment, a capacitance (a gate-drain combined capacitance Cgd) between the gate and the drain of each of the switching elements Q1 and Q2 is set larger by adding values of capacitors Crv1 and Crv2 respectively added to the values of parasitic capacitors Cgd1 and Cgd2 between the gate and the drain of the respective switching elements Q1 and Q2. Further, a current of the gate-drain combined capacitor Cgd in association with an ON state of the body diode in a period during which a resonant circulation current on ON-OFF operation flows is used to cause a great voltage drop at a gate resistor Rg to such an extent that gate-source voltages Vgs1, Vgs2 are made smaller than an ON threshold voltage Vth of MOSFET, thus making it possible to secure a dead time period. Here, the gate-drain combined capacitance Cgd1+Crv1 may not be necessarily equal to the gate-drain combined capacitance Cgd2+Crd2.

Hereinafter, a description will be given specifically for the first embodiment with reference to FIG. 1 and FIG. 2. As a specific operation example, a description will be given for operations of a half-wave resonance circuit. FIG. 1 shows a circuit diagram. A MOSFET is used as the switching elements Q1 and Q2. Regarding gate signals Vg of these switching elements, one gate signal Vg is divided into two signals Vg1 and Vg2 by using a drive transformer T2 so that signals are given a mutually reversed polarity. The signal Vg2 is the same polarity as that of the gate signal Vg, and used to drive the low side switching element the signal Vg1 is reverse in polarity to that of the gate signal Vg, and used to drive the high side switching element.

The direct current power supply Vin includes, for example, a power supply circuit configured to obtain a direct current voltage, in which a commercial alternating current power supply is subjected to full-wave rectification and to smoothing by a smoothing capacitor. A series circuit of the switching elements Q1 (high side switching element) and Q2 (low side switching element) containing, e.g., a MOSFET or an IGBT is connected to the both ends of the direct current power supply Vin. A voltage resonance capacitor Crv is connected in parallel to the switching element Q2. A series circuit including a leakage inductance Lri, a primary winding N11 (primary winding inductance Lp) of the output transformer T1 and a current resonance capacitor Cri is also connected in parallel to the switching element Q2.

The diode Do and the smoothing capacitor Co are connected in parallel to a secondary winding N12 of the output transformer T1, and the primary winding N11 and the secondary winding N12 of the output transformer T1 are wound around so as to give a voltage polarity indicated by the illustrated polarity mark to constitute a rectifying smoothing circuit. An output voltage of the rectifying smoothing circuit obtained through rectification and smoothing by the diode Do and the smoothing capacitor Co is given as an output voltage of the switching power supply device 1 to supply a direct current power to a load RL connected in parallel to the smoothing capacitor Co. The voltage feedback circuit 2 detects an output voltage of the rectifying smoothing circuit and outputs the voltage to a gate power supply Vp. Based on this detected voltage, the gate power supply Vp generates a gate signal Vg, thereby controlling an output voltage of the switching power supply device 10. The gate power supply Vp is provided with a gate signal control circuit for generating a gate signal Vg but not provided with functions for setting the dead time td.

The output of the gate power supply Vp is connected to the primary winding N21 of the drive transformer T2. The secondary winding N22 and the tertiary winding N23 of the drive transformer T2 are wound around so as to give a mutually reversed voltage polarity, as shown in the drawing.

A gate resistor Rg11 and a series circuit connected in parallel to the gate resistor Rg11 which includes a gate resistor Rg12 and a diode Dg1 are connected between the secondary winding N22 and the gate of the high side switching element Q1. The series circuit including the gate resistor Rg12 and the diode Dg1 is connected for speeding up OFF operation of the switching element Q1 and designed so that a combined resistance of the gate resistor Rg11 with the gate resistor Rg12 is given as a gate resistance at the OFF time of the switching element Q1 (smaller in gate resistance than at the ON time).

A gate resistor Rg21 and a series circuit connected in parallel to the gate resistor Rg21 which includes a gate resistor Rg22 and a diode Dg2 are connected between the tertiary winding N23 and the gate of the low side switching element Q2. The series circuit including the gate resistor Rg22 and the diode Dg2 is connected for speeding up OFF operation of the switching element Q2 and designed so that a combined resistance of the gate resistor Rg21 with the gate resistor Rg22 is given as a gate resistance at the OFF time of the switching element Q2 (smaller in gate resistance than at the ON time).

A capacitor Crv1 is connected between the gate and drain of the switching element Q1, and a capacitor Crv2 is connected between the gate and the drain of the switching element Q2.

Parasitic capacitors Cgd1 (gate-drain capacitor), Cgs1 (gate-source capacitor) and Cds1 (drain-source capacitor) and a body diode DH (acting as a high side feedback diode) are connected between the gate, the source and the drain of the switching element Q1. Parasitic capacitors Cgd2 (gate-drain capacitor), Cgs2 (gate-source capacitor) and Cds2 (drain-source capacitor) and a body diode DL (acting as a low side feedback diode) are also connected between the gate, the source and the drain of the switching element Q2.

In the present embodiment, as shown in FIG. 1, the capacitors Crv1 and Crv2 are connected in parallel to the parasitic capacitors Cgd1 and Cgd2 between the gates and drains of the switching elements Q1 and Q2. Consequently, a resonance current flowing through a gate resistor is increased, and a voltage drop occurring at the gate resistor is increased. A combined capacitor Cgd between the gate and the drain at this time is a combination of the Crv1 with the Cgd1 or a combination of the Crv2 with the Cgd2.

A gate-source voltage Vgs is given as a difference Vg−Vrg between a gate signal Vg and a voltage Vrg developed at the gate resistor. Therefore, a voltage developed at the gate resistor is increased by a resonant circulation current and a gate-source voltage Vgs is adjusted to be lower than an ON threshold voltage Vth of the switching elements, thereby allowing the switching elements not to conduct (not to turn ON) in a voltage resonance period. Then, after completion of the voltage resonance period, the gate voltage is elevated to the ON threshold voltage Vth or more to conduct the switching element (ON), thereby retaining resonance. In this manner, it is possible to provide an optimal dead time td depending on a voltage resonance period.

The above operations will be specifically described with reference to FIG. 2.

Figure 2:
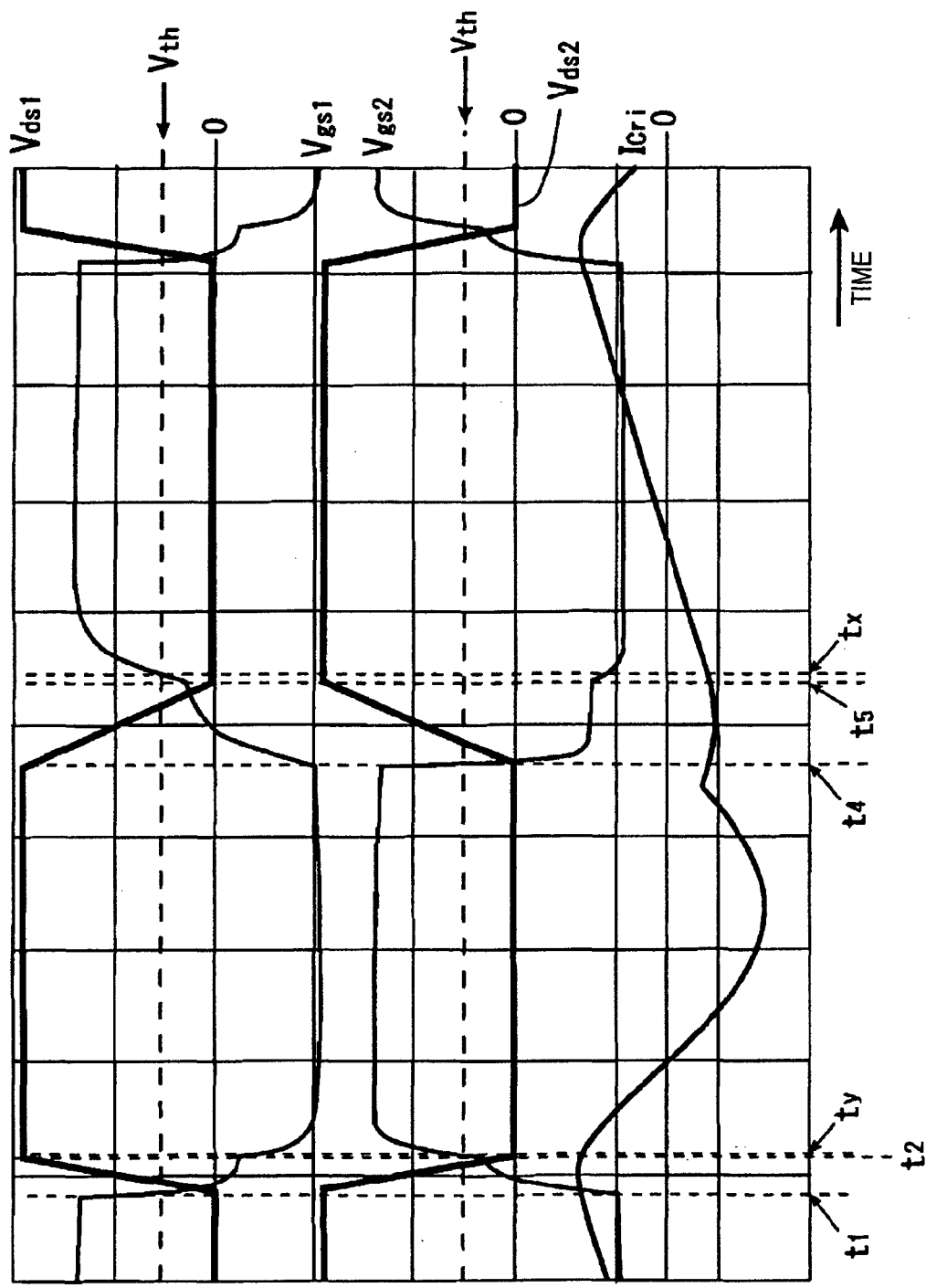
FIG. 2 is a diagram showing operating waveforms of the switching power supply device according to the first embodiment of the present invention.

FIG. 2 shows operating waveforms of a half-wave current resonance circuit shown in FIG. 1. Here, the high side switching element Q1 is kept OFF while the low side switching element Q2 is kept ON at the timing t4. At this time, when a gate-source voltage Vgs2 of the low side switching element Q2 is changed to an ON threshold voltage Vth or lower, the low side switching element Q2 is shifted to an OFF state. At this time, a voltage resonance capacitor Crv starts to be charged by a resonance current ICri. A drain-source capacitor Cds2 of the low side switching element Q2 also starts to be charged, thereby increasing a drain-source voltage Vds2.

On the other hand, the drain source capacitor Cds1 of the high side switching element Q1 starts to be discharged, thereby decreasing a drain-source voltage Vds1. In a period from t4 to t6 during which the voltage resonance capacitor Crv and the drain-source capacitor Cds2 of the switching element Q2 are charged, a resonance current also flows through the gate resistor Rg1 and the gate-drain combined capacitor Cgd of the switching element Q1, thereby causing a voltage drop at the gate resistor Rg1. This voltage drop prevents the gate-source capacitor Cgs1 of the switching element Q1 from being charged, thereby a gate voltage of the high side switching element Q1 is unable to rise to an ON threshold voltage Vth. Therefore, even if a gate signal Vg is supplied for turning the switching element Q1 on by simultaneously changing a gate signal Vg1 of the high side switching element Q1 and a gate signal Vg2 of the low side switching element Q2, the switching element Q1 will not be turned on. When the voltage resonance capacitor Crv is charged up to a power supply voltage and the capacitors Cds1 and the Cds2 are completely charged and discharged, no resonance current will flow through the gate-drain combined capacitor Cgd of the high side switching element Q1. Then, the gate voltage rises and reaches the ON threshold voltage Vth, which causes the high side switching element Q1 to be turned on at a timing of tx. Therefore, it is possible to set a dead time to a total of a period from t4 to t5 during which voltage resonance is performed and a period from t5 to tx during which the gate voltage reaches the ON threshold voltage Vth.

Figure 3:
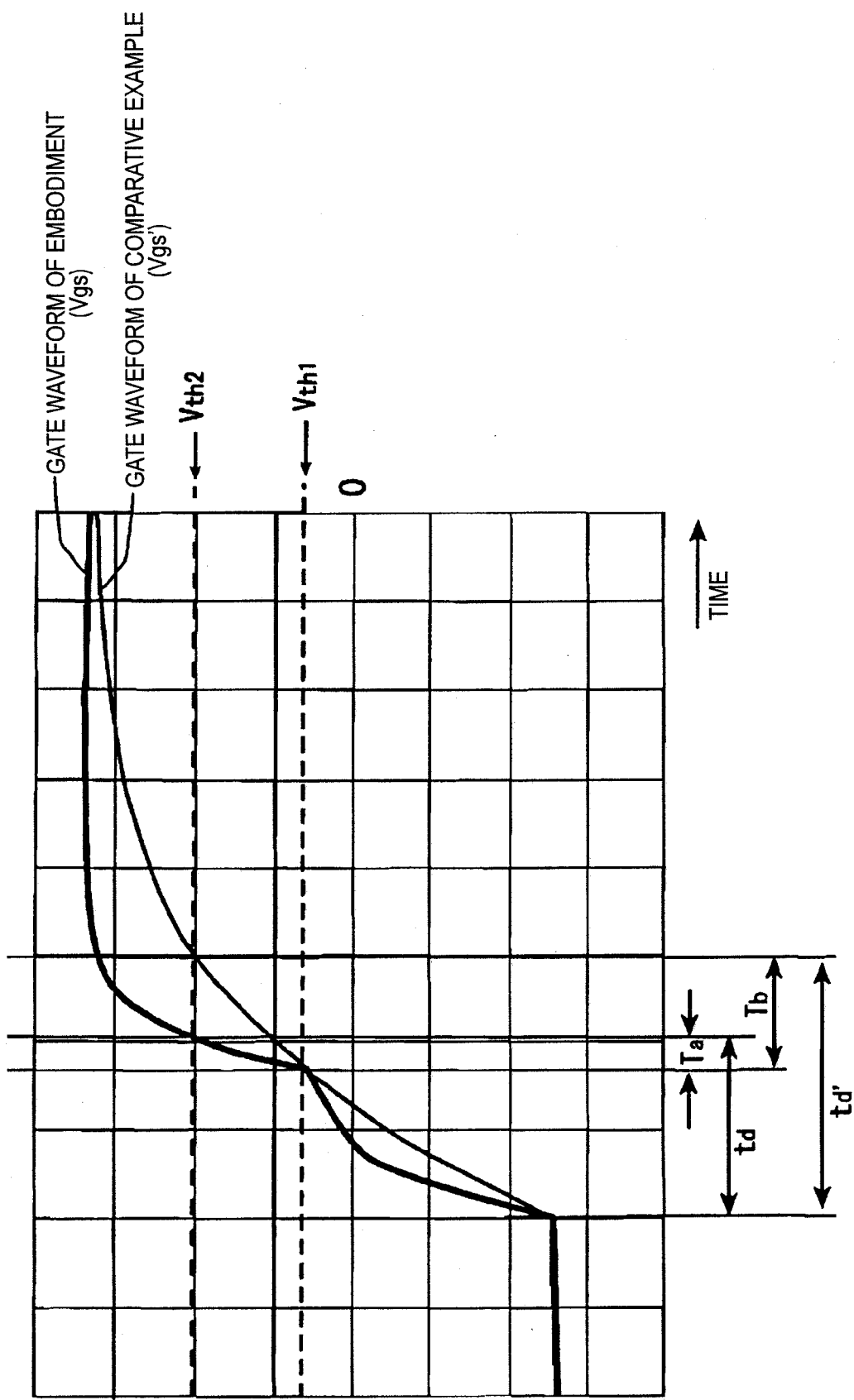
FIG. 3 is a diagram comparatively showing a gate waveform of a switching element of the present embodiment and that of a comparative example.
Figure 10:
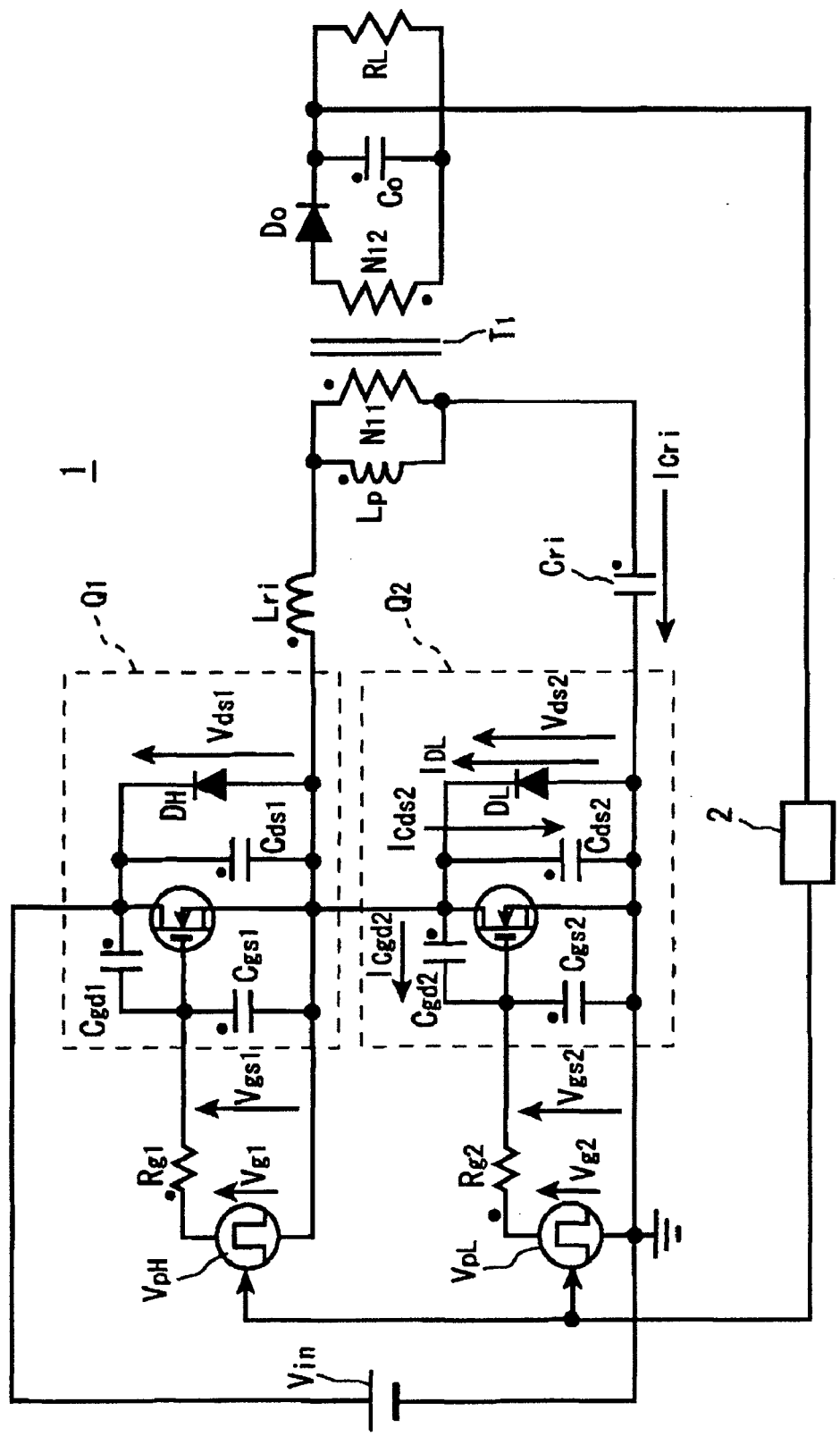
FIG. 10 is a diagram showing one example of a circuit configuration of a switching power supply device.
Figure 11:
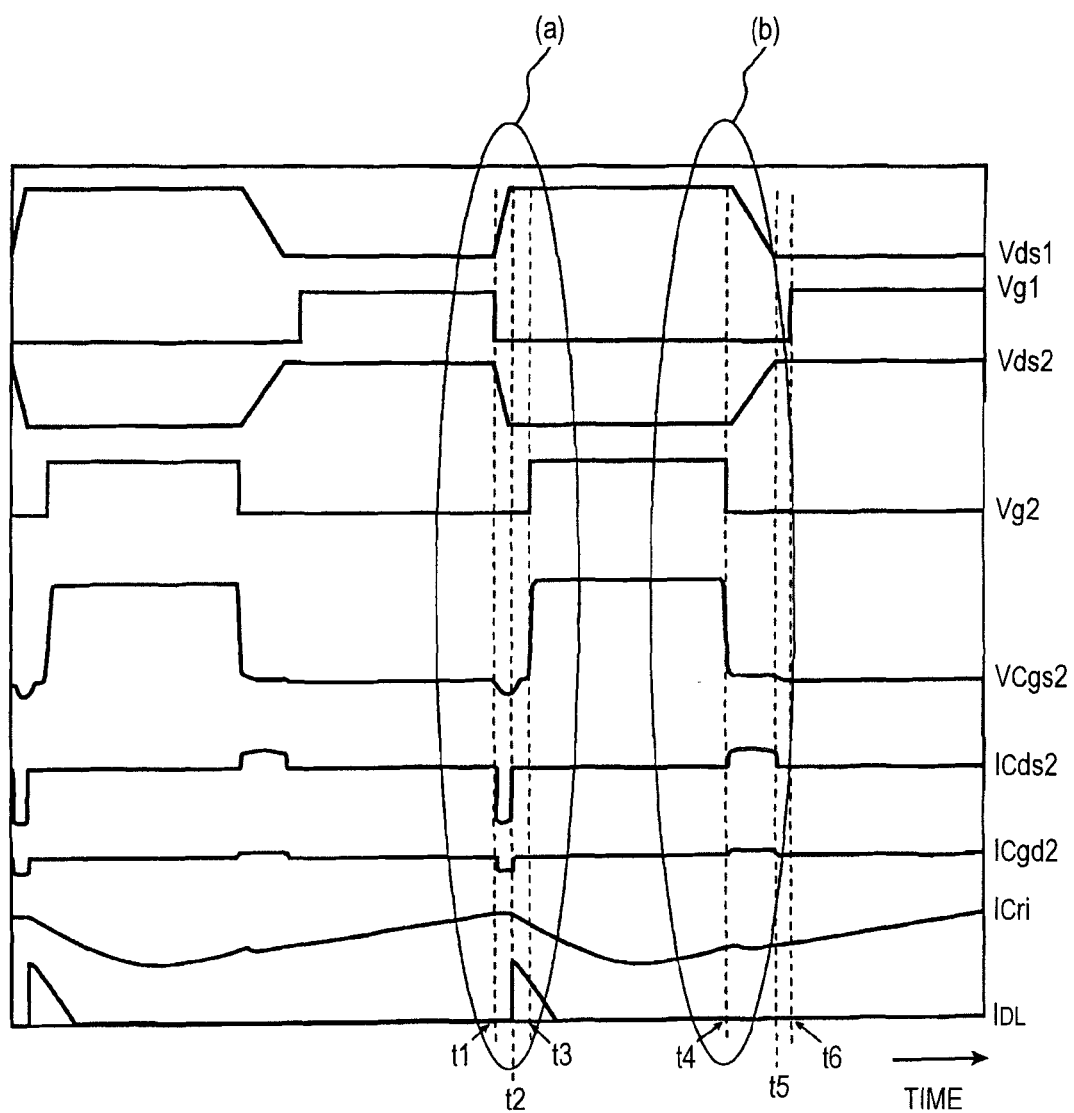
FIG. 11 is a diagram showing one example of operating waveforms of the switching power supply device.
Figure 12:
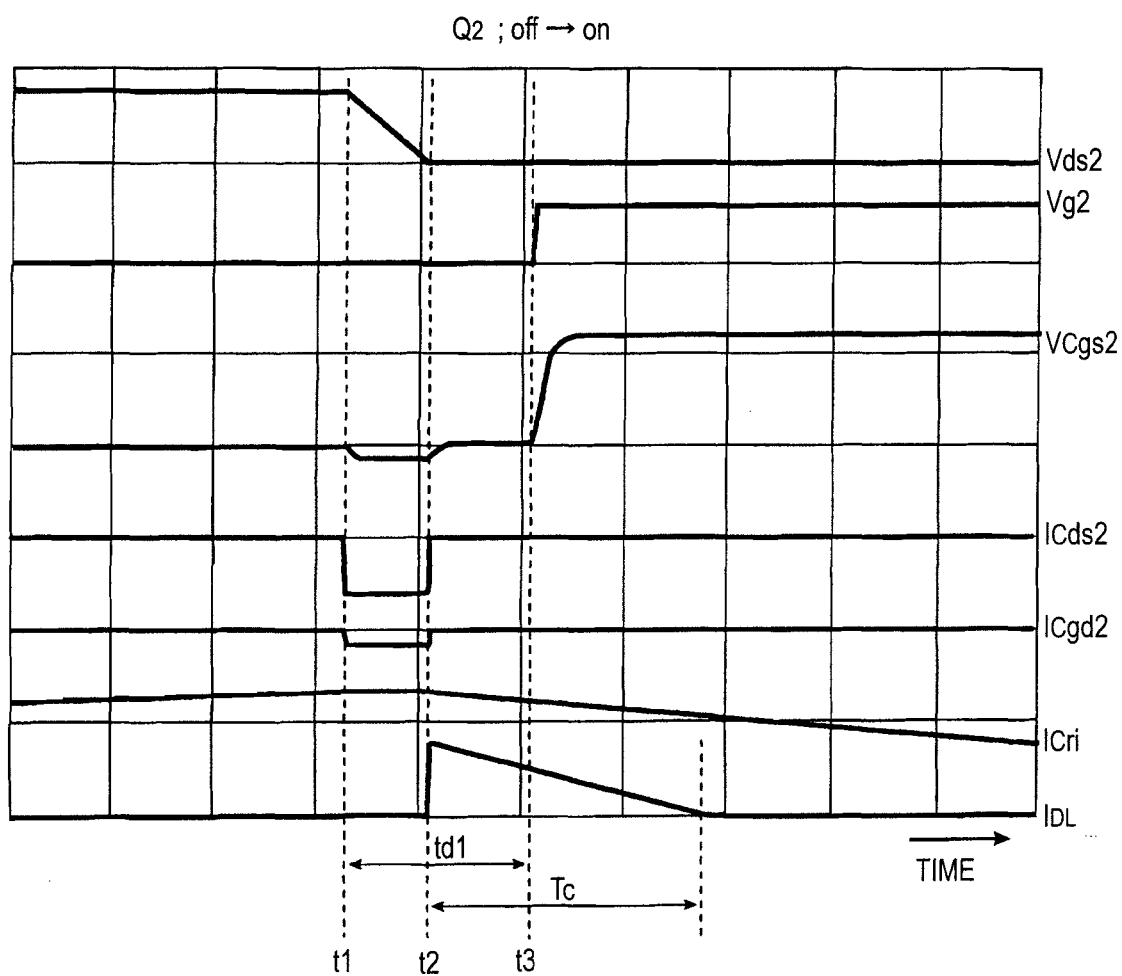
FIG. 12 is an enlarged view showing operating waveforms of the switching power supply device.
Figure 13:
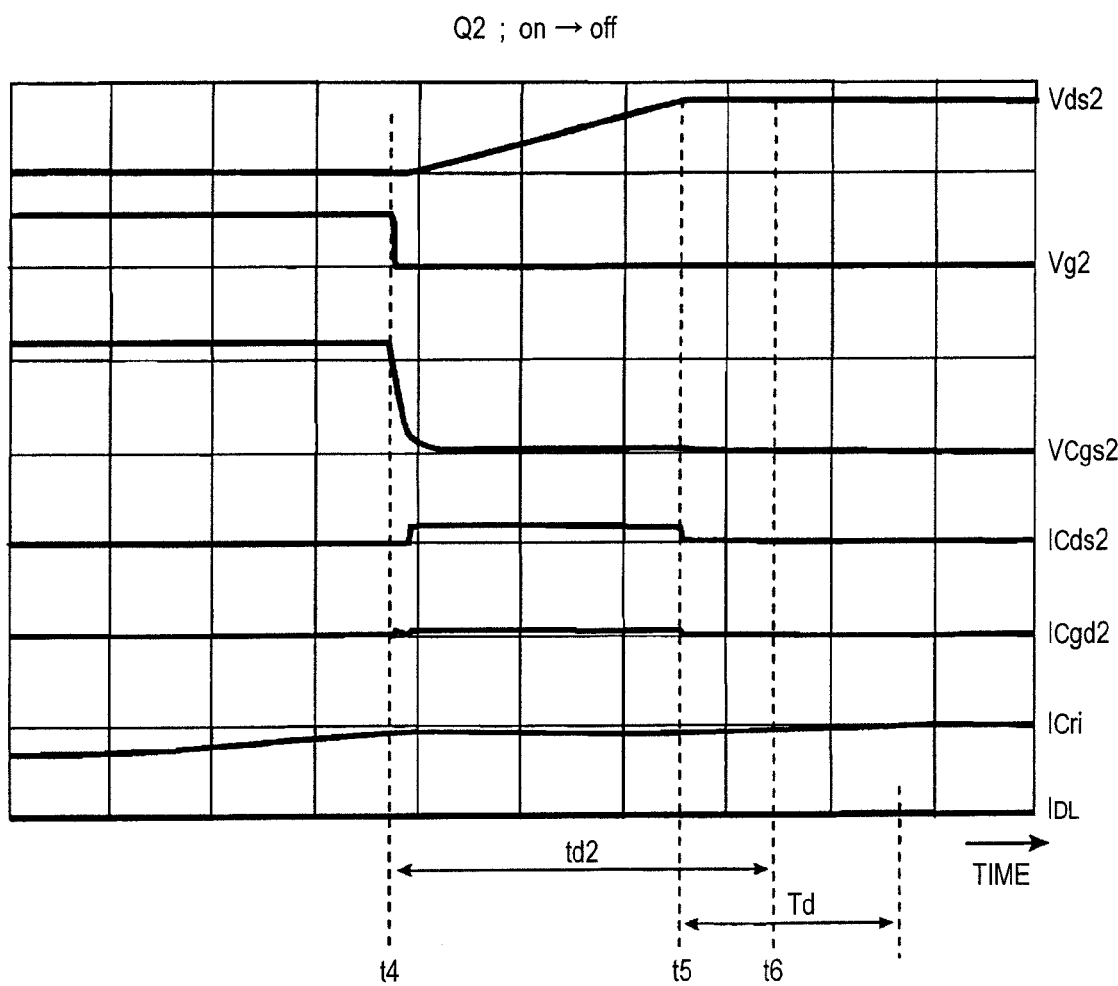
FIG. 13 is an enlarged view of the operating waveforms of the switching power supply device.

FIG. 3 shows a rising-up of the gate waveform of the present embodiment and the gate waveform of the comparative example obtained by the switching power supply device shown in FIG. 10. In this figure, the gate waveform of the present embodiment is made overlapped on that of the comparative-example gate waveform at an ON threshold voltage Vth1. In a circuit of the comparative example, at a part exceeding the ON threshold voltage Vth1, the gate waveform rises up slowly, while the gate waveform of the present embodiment rises up steeply. This is because no resonance current will flow through the gate resistor Rg1 and the gate-drain combined capacitor Cgd at the part exceeding the ON threshold voltage Vth1. Further, for the gate waveform of the comparative example, in order to suppress switching loss, a gate resistance is required to be increased to dull the gate waveform, thereby making the time long to reach an ON threshold voltage Vth, while the embodiment of the present invention does not need this, thus making it possible to decrease the gate resistance. Thereby, as shown in FIG. 3, in a range exceeding an ON threshold voltage Vth1, the rising up of the gate waveform can be made steeper than that of the gate waveform of the comparative example. On the assumption that the ON threshold voltage Vth of a switching element is shifted from Vth1 to Vth2 due to a change in temperature or others, since the gate waveform rises up slowly in the circuit of the comparative example, the dead time in a period Tb will therefore greatly change. However, in the circuit of the present embodiment, as shown in the figure, the dead time is allowed to change within a period Ta shorter than the period Tb, thereby suppressing the change in the dead time to a smaller extent.

As described above, according to the present embodiment, even if gate signals Vg1 and Vg2 of the high side switching element and the low side switching element are supplied without setting the dead time td, the high side switching element Q1 will not turn on until the gate voltage rises and reaches an ON threshold voltage Vth, thus eliminating the necessity for setting the dead time td inside a gate signal control circuit. More specifically, according to the present embodiment, after no resonance current flows through a drain-source capacitor, a gate voltage is elevated up to the ON threshold voltage Vth at a time constant shorter than the comparative example. Consequently, the dead time td can be automatically adjusted to give an appropriate value. In general, a predetermined dead time td is generated in a gate signal control circuit based on a half-wave current resonance circuit (half bridge type) or a full-wave current resonance circuit (full bridge type). However, in the embodiment of the present invention, setting of the dead time td is not required. This is preferable in a case where there is a difficulty in securing dead time, for example, where a drive transformer is used to control simultaneously ON-OFF operation of a plurality of switching elements with one gate signal Vg.

Further, according to the present embodiment, after no resonance current flows through the drain-source capacitor, the gate voltage can be elevated up to an ON threshold voltage Vth at a time constant shorter than the comparative example. Consequently, it is possible to suppress the change in dead time td when the ON threshold voltage Vth of the switching element is changed due to a change in temperature.

Still further, according to the present embodiment, after no resonance current flows through the drain-source capacitor, the gate voltage can be elevated up to an ON threshold voltage Vth at a time constant shorter than the comparative example thus making it possible to shorten the dead time td than the comparative example. In general, a gate resistance is increased to dull a gate waveform, and the time necessary for reaching the ON threshold voltage Vth is delayed to give a dead time. However, an attempt to secure the dead time for a longer period of time will result in a longer period from the time when the gate signal Vg is output to the time when the gate-source voltage Vgs rises. Further, a drain current is restricted unintentionally due to gate voltage characteristics of the switching element or the ON threshold voltage Vth is changed due to a changes in temperature, by which the dead time td is also greatly changed. Thus, according to the present embodiment, the above-described problem will not arise.

In addition, according to the present embodiment, the switching element is allowed to turn on quickly after a resonance current starts to flow through a body diode, thus making it possible to decrease the time for supplying a gate driving voltage. Therefore, heating of the gate resistor or loss of the gate driving circuit is decreased to improve power supply efficiency. This is in particular advantageous in operating a circuit at higher frequencies.

Second Embodiment

Figure 4:
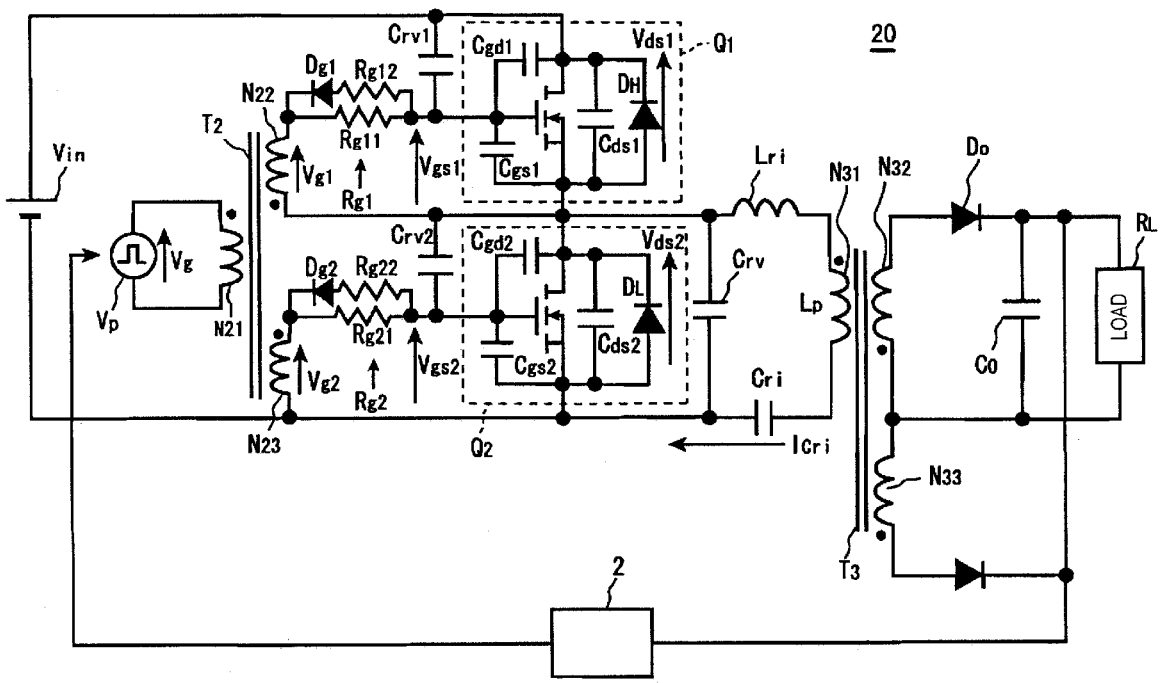
FIG. 4 is a diagram showing a circuit configuration of a switching power supply device according to a second embodiment of the present invention.
Figure 5:
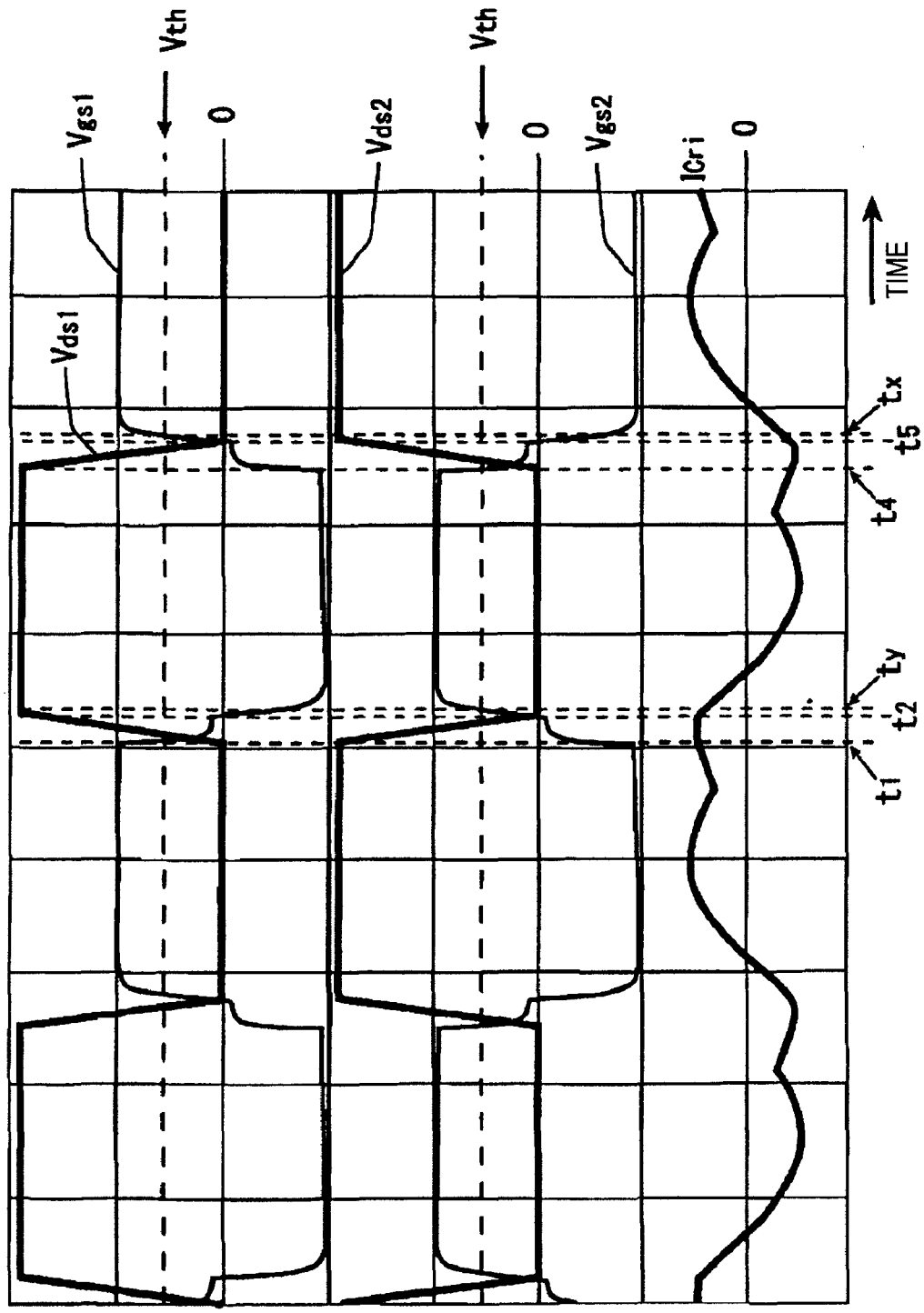
FIG. 5 is a diagram showing operating waveforms of the switching power supply device according to the second embodiment of the present invention.

FIG. 4 shows a circuit configuration of a switching power supply device 20 according to a second embodiment of the present invention. The present embodiment provides a full-wave current resonance circuit which is different from the first embodiment in that the output transformer T1 of the first embodiment is changed to an output transformer T3 including a primary winding N31, a secondary winding N32 and a tertiary winding N33, and the rectifying smoothing circuit is changed to a full-wave rectification circuit. Other configurations are the same as those in the first embodiment. FIG. 5 shows operating waveforms. The individual waveforms shown in FIG. 5 are similar to those shown in FIG. 2. However, the output transformer T3 is provided with the secondary winding N32 and the tertiary winding N33, thereby giving a circuit which is symmetrical in polarity of the output voltage. Thus, the operations are reversed in polarity every half cycle of switching and substantially symmetrical. Since these operations can be estimated from a description of the first embodiment, a detailed description will be omitted here. In the present embodiment, the same advantage as that obtained in the first embodiment can be obtained, and a smoother output voltage than that obtained in the first embodiment can also be obtained.

Third Embodiment

Figure 6:
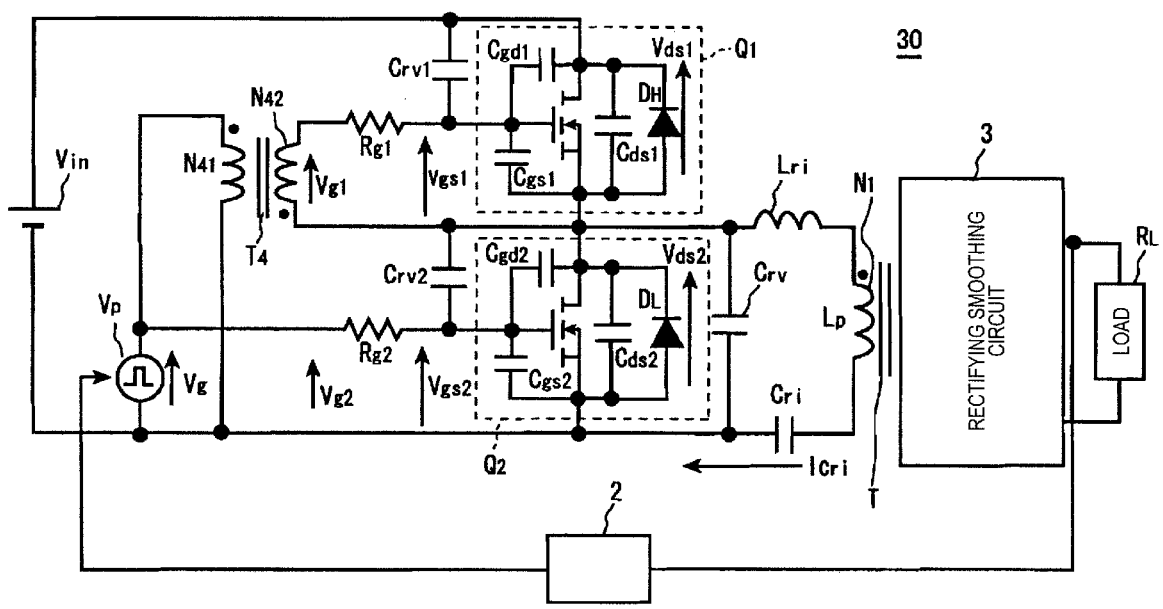
FIG. 6 is a diagram showing a circuit configuration of a switching power supply device according to a third embodiment of the present invention.
Figure 7:
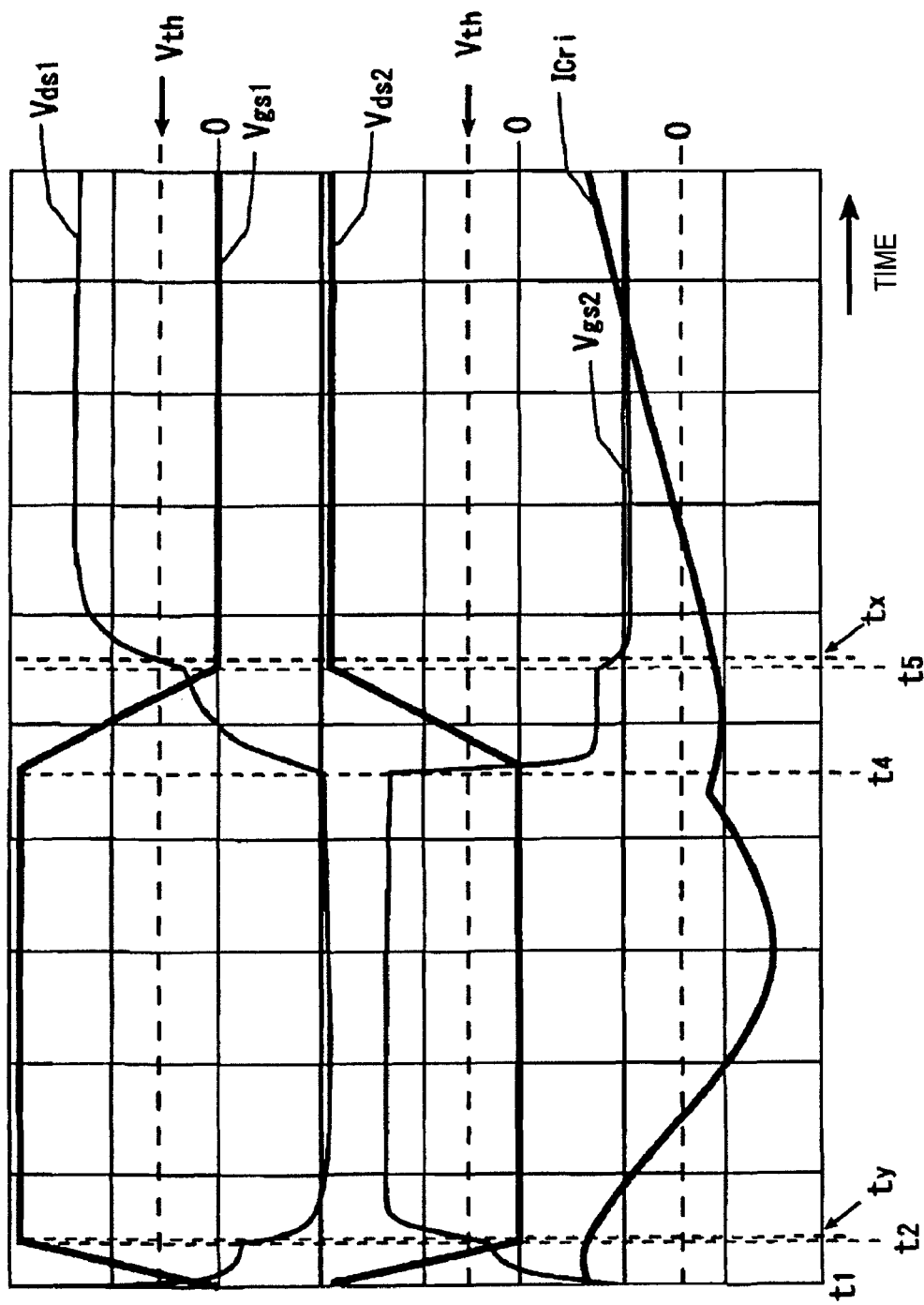
FIG. 7 is a diagram showing operating waveforms of the switching power supply device according to the third embodiment of the present invention.

FIG. 6 shows a circuit configuration of a switching power supply device 30 according to a third embodiment of the present invention. The present embodiment shows a case where a drive transformer T4 is used only on the high side. Although the drive transformer T4 is used on the high side in the present embodiment, the drive transformer may be used only on the low side. A rectifying smoothing circuit 3 is a simplified type of the rectifying smoothing circuit used in the first embodiment and the second embodiment. FIG. 7 shows operating waveforms when the switching power supply device 30 is changed to a half-wave current resonance circuit. The operations of the present embodiment are fundamentally similar to those of the first embodiment. In the present embodiment, a level shift (signal isolation) on the high side (or on the low side) can be conducted by the drive transformer T4. With the present embodiment, the same effect as that obtained in the first embodiment can be obtained. Further, a tertiary winding of the drive transformer can be omitted.

Fourth Embodiment

Figure 8:
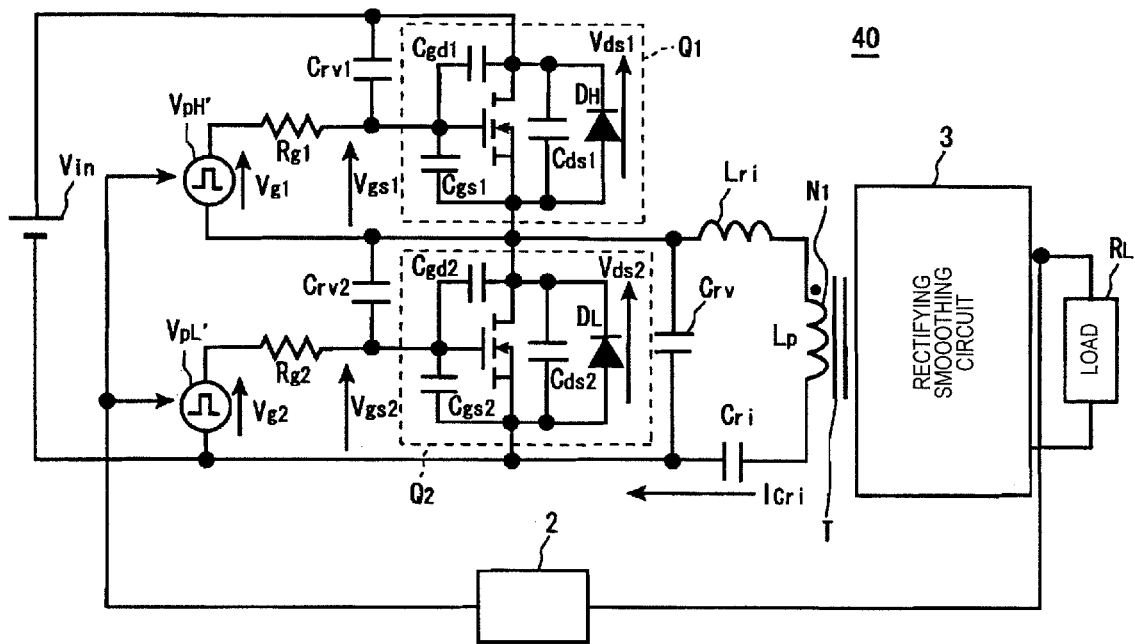
FIG. 8 is a diagram showing a circuit configuration of a switching power supply device according to a fourth embodiment of the present invention.
Figure 9:
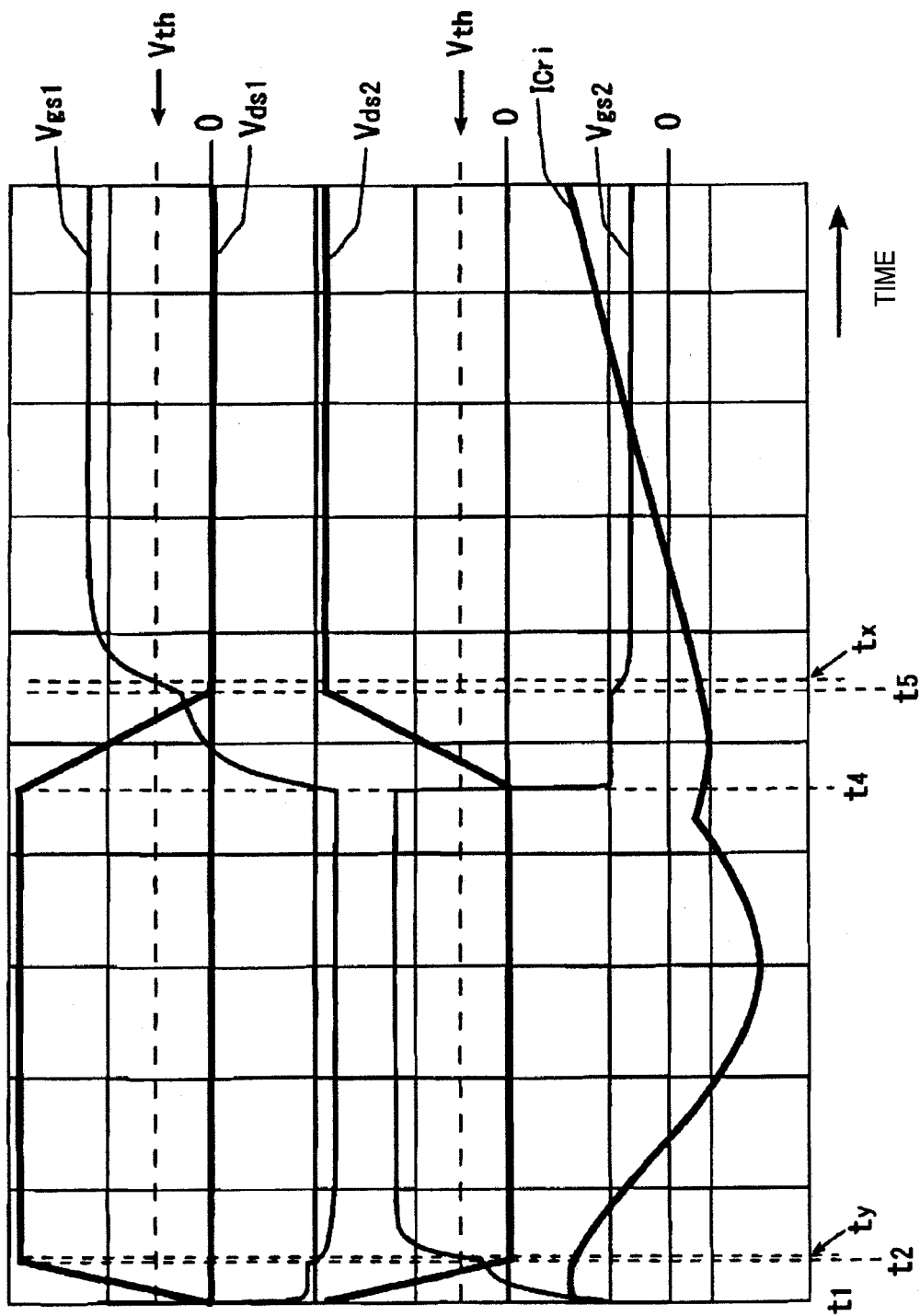
FIG. 9 is a diagram showing operating waveforms of the switching power supply device according to the fourth embodiment of the present invention.

FIG. 8 shows a circuit configuration of a switching power supply device 40 according to a fourth embodiment of the present invention. FIG. 9 shows operating waveforms of the switching power supply device 40 in the present embodiment. The switching power supply device 40 has a circuit configuration in which a level shift circuit is used to drive a gate power supply VpH' on the high side and a gate power supply VpL' on the low side. It is usually possible to set the timing of a gate signal independently for a gate power supply VpH on the high side and a gate power supply VpL on the low side by using a level shift circuit. However, in the present embodiment, no dead time is set for the gate power supply VpH' or the gate power supply VpL'. It is, thereby, possible to simplify the gate power supplies VpH' and VpL'. In the present embodiment, since no drive transformer is used, there is obtained no advantage due to use of a drive transformer can be obtained. However, in another aspect, the same effect as that obtained in the first embodiment can be obtained.

As described above, a specific description has been given according to the embodiments. However, these embodiments are only examples, to which, as a matter of course, the present invention shall not be limited thereto.

For example, the switching elements are described with reference to a MOSFET as an example. However, the switching elements shall not be limited thereto but may include an FET (such as a junction type FET) which is not an IGBT or MOS.

Further, in the present embodiment, the capacitors Crv1 and Crv2 are connected in parallel to the gate-drain capacitors Cgd1 and Cgd2 of the switching elements Q1 and Q2. In place of this connection, a switching element may be used which is great in gate-drain capacitors Cgd1 and Cgd2.

Furthermore, where a relationship of (ON threshold voltage Vth)<(voltage value of gate signal Vg)−(voltage drop of gate resistor Vrg) is satisfied in a voltage resonance period during which a resonance current is sufficiently great, the capacitors Crv1 and Crv2 can be eliminated.

Still further, the voltage resonance capacitor Crv shown, e.g., in FIG. 1 may be omitted when output capacitance of the switching elements Q1 and Q2 (i.e., the capacitance of the capacitor Cds) is sufficient.

Also an example is given where a series circuit including a leakage inductance Lri, a primary winding N11 of the output transformer T1 and a current resonance capacitor Cri is connected in parallel to the low side switching element Q2. However, a series circuit including a leakage inductance Lri, a primary winding N11 of the output transformer T1 and a current resonance capacitor Cri may be connected in parallel to the high side switching element Q1.

In addition, in place of leakage inductance of the output transformer T1, a reactor may be connected.

According to the embodiments of the invention, it is possible to provide a gate drive circuit capable of adjusting a dead time inside the gate drive circuit without setting the dead time in a gate signal control circuit, capable of keep an appropriate value of the dead time even when turn-off/turn-on characteristics are changed, and capable of improving the efficiency.

The present invention is applicable to a wide variety of electronic devices dealing with a zero voltage switching (ZVS) by utilizing voltage and current resonance phenomena, in addition to a switching power supply device.

What is claimed is:

1. A resonant switching power supply device comprising:
a first switching element and a second switching element which are configured to convert and adjust power,
wherein a capacitance of a first gate-drain capacitor existing between a gate and a drain of the first switching element and a resistance of a first gate resistor of the first switching element are set such that, in a period during which a resonance current flows by switching the second switching element, a gate-source voltage of the first switching element is lower than an ON threshold voltage of the first switching element due to the resonance current divided into the first gate-drain capacitor, and
wherein a capacitance of a second gate-drain capacitor existing between a gate and a drain of the second switching element and a resistance of a second gate resistor of the second switching element are set such that, in a period during which a resonance current flows by switching the first switching element, a gate-source voltage of the second switching element is lower than an ON threshold voltage of the second switching element due to the resonance current divided into the second gate-drain capacitor.

2. The switching power supply device according to claim 1, further comprising a single drive transformer configured to generate gate signals for the first switching element and the second switching element.

3. The switching power supply device according to claim 2, wherein no dead time is set for the gate signals.

4. The switching power supply device according to claim 1, wherein each of the first and second gate-drain capacitors comprises a parasitic capacitor existing between the gate and the drain of a respective one of the first and second switching elements and a capacitor connected in parallel to the parasitic capacitor.

5. The switching power supply device according to claim 1, wherein each of the first and second gate-drain capacitors comprises only a parasitic capacitor existing between the gate and the drain of a respective one of the first and second switching element.

6. A method for adjusting a dead time of a resonant switching power supply device comprising a first switching element and a second switching element which are connected to a direct current power supply, said method comprising:
  setting a capacitance of a first gate-drain capacitor existing between a gate and a drain of the first switching element and a resistance of a first gate resistor of the first switching element such that a gate-source voltage of the first switching element is lower than an ON threshold voltage of the first switching element by generating a voltage drop at the first gate resistor by a resonance current divided into the first gate-drain capacitor of the first switching element in response to a switching of the second switching element; and
  setting a capacitance of a second gate-drain capacitor existing between a gate and a drain of the second switching element and a resistance of a second gate resistor of the second switching element such that a gate-source voltage of the second switching element is lower than an ON threshold voltage of the second switching element by generating a voltage drop at the second gate resistor by a resonance current divided into the second gate-drain capacitor of the second switching element in response to a switching of the first switching element.

7. The method for adjusting a dead time of a switching power supply device according to claim 6, wherein first and second gate signals are respectively applied to gates of the first switching element and the second switching element via the first and second gate resistors thereof, and an ON/OFF state of each of the first gate signal and the second gate signal is changed at a same timing such that the ON/OFF state of the first gate signal is opposite to the ON/OFF state of the second gate signal.

8. The method for adjusting a dead time of a switching power supply device according to claim 7, wherein no dead time is set for the gate signals.

* * * * *